United States Patent
Bergström et al.

(10) Patent No.: US 10,630,428 B2
(45) Date of Patent: Apr. 21, 2020

(54) FLEXIBLE CONFIGURATION OF HARQ PROCESS FEEDBACK

(71) Applicant: Telefonaktiebolaget L M Ericsson (publ), Stockholm (SE)

(72) Inventors: Andreas Bergström, Vikingstad (SE); Håkan Andersson, Linköping (SE); Johan Furuskog, Stockholm (SE); Niclas Wiberg, Linköping (SE); Qiang Zhang, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 232 days.

(21) Appl. No.: 14/443,716

(22) PCT Filed: Apr. 10, 2015

(86) PCT No.: PCT/SE2015/050427
§ 371 (c)(1),
(2) Date: May 19, 2015

(87) PCT Pub. No.: WO2016/060599
PCT Pub. Date: Apr. 21, 2016

(65) Prior Publication Data
US 2016/0261379 A1  Sep. 8, 2016

Related U.S. Application Data

(60) Provisional application No. 62/063,161, filed on Oct. 13, 2014.

(51) Int. Cl.
*H04L 1/18* (2006.01)
*H04L 1/16* (2006.01)
(Continued)

(52) U.S. Cl.
CPC .......... *H04L 1/1685* (2013.01); *H04L 1/1614* (2013.01); *H04L 1/1822* (2013.01);
(Continued)

(58) Field of Classification Search
None
See application file for complete search history.

(56) References Cited

U.S. PATENT DOCUMENTS 8,588,142 B2   11/2013  Seo et al.
2006/0018268 A1  1/2006  Kakani et al.
(Continued)

FOREIGN PATENT DOCUMENTS

CN   101919194 A   12/2010
CN   102090135 A    6/2011
(Continued)

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", 3GPP TS 36.300 V12.3.0, Sep. 2014, 1-215.
(Continued)

*Primary Examiner* — Ayaz R Sheikh
*Assistant Examiner* — Sori A Aga
(74) *Attorney, Agent, or Firm* — Murphy, Bilak & Homiller, PLLC

(57) ABSTRACT

Techniques are disclosed whereby a signal is transmitted from a wireless network to a wireless device, requesting automatic repeat-request, ARQ, feedback for certain indicated ARQ processes. This asynchronous approach addresses a problem with irregular ARQ feedback for dynamic time-division-duplexing, and also allows for relaxed processing-time constraints in the wireless device.
(Continued)

An example method, in a wireless device, comprises receiving (610) from a wireless communication network, in a first transmission-time interval, a request for ARQ feedback, the request indicating one or more ARQ processes. The example method further comprises transmitting (620) to the wireless communication network, in a second transmission-time interval, ARQ feedback information for each of the one or more indicated ARQ processes.

46 Claims, 5 Drawing Sheets

(51) Int. Cl.
*H04L 5/14* (2006.01)
*H04W 72/04* (2009.01)

(52) U.S. Cl.
CPC ......... *H04L 5/1469* (2013.01); *H04W 72/042* (2013.01); *H04W 72/0413* (2013.01)

(56) References Cited

U.S. PATENT DOCUMENTS

| | | | |
|---|---|---|---|
| 2007/0245201 | A1 | 10/2007 | Sammour et al. |
| 2008/0181173 | A1 | 7/2008 | Wei |
| 2008/0212612 | A1 | 9/2008 | Singh et al. |
| 2009/0197611 | A1 | 8/2009 | Chin et al. |
| 2009/0287976 | A1* | 11/2009 | Wang ............... H04L 1/1812 714/748 |
| 2010/0008312 | A1 | 1/2010 | Viswanath |
| 2010/0284490 | A1 | 11/2010 | Kim et al. |
| 2011/0029831 | A1* | 2/2011 | Lee ............... H04L 1/1614 714/748 |
| 2011/0141901 | A1* | 6/2011 | Luo ............... H04L 1/1822 370/241 |
| 2012/0134305 | A1 | 5/2012 | Damnjanovic |
| 2013/0021981 | A1 | 1/2013 | Huang et al. |
| 2013/0142076 | A1* | 6/2013 | Ramos ............... H04W 24/00 370/254 |
| 2014/0098761 | A1* | 4/2014 | Lee ............... H04W 74/006 370/329 |
| 2014/0362797 | A1 | 12/2014 | Aiba et al. |
| 2015/0155984 | A1 | 6/2015 | Peng |

FOREIGN PATENT DOCUMENTS

| | | |
|---|---|---|
| CN | 102598760 A | 7/2012 |
| CN | 102893551 A | 1/2013 |
| CN | 103190112 A | 7/2013 |
| EP | 1798926 A1 | 6/2007 |
| JP | 2008508812 A | 3/2008 |
| JP | 2011511581 A | 4/2011 |
| JP | 2012533204 A | 12/2012 |
| JP | 2013128202 A | 6/2013 |
| JP | 2015516131 A | 6/2015 |
| JP | 2015525045 A | 8/2015 |
| WO | 2006015252 A1 | 2/2006 |
| WO | 2008041098 A2 | 4/2008 |
| WO | 2008096259 A2 | 8/2008 |
| WO | 2009080290 A1 | 7/2009 |
| WO | 2011005014 A2 | 1/2011 |
| WO | 2011015331 A1 | 2/2011 |
| WO | 2011116365 A2 | 9/2011 |
| WO | 2011132413 A1 | 10/2011 |
| WO | 2013155473 A1 | 10/2013 |
| WO | 2013167290 A1 | 11/2013 |
| WO | 2014026317 A2 | 2/2014 |

OTHER PUBLICATIONS

3GPP, "3rd Generation Partnership Project; Technical Specification Group Radio Access Network; Evolved Universal Terrestrial Radio Access (E-UTRA); Multiplexing and channel coding (Release 11)", 3GPP TS 36.212 V11.0.0, Sep. 2012, 1-79.

3GPP, "3rd Generation Partnership Project; Technical Specification Group Radio Access Network; Evolved Universal Terrestrial Radio Access (E-UTRA); Physical Channels and Modulation (Release 11)," 3GPP TS 36.211 V11.0.0, Sep. 2012, 1-106.

3GPP, "3rd Generation Partnership Project; Technical Specification Group Radio Access Network; Evolved Universal Terrestrial Radio Access (E-UTRA); Physical layer procedures (Release 11)," 3GPP TS 36.213 V11.0.0, Sep. 2012, 1-143.

* cited by examiner

FLEXIBLE CONFIGURATION OF HARQ PROCESS FEEDBACK

TECHNICAL FIELD

The technology disclosed herein relates generally to wireless communication networks, and more particularly relates to techniques involving automatic repeat-request (ARQ) feedback in such networks.

BACKGROUND

Automatic repeat-request (ARQ) is an error-control technique used in many wireless networks. With ARQ, a receiver of data transmissions sends acknowledgements (ACKs) or negative acknowledgments (NACKs), referred to "ARQ feedback," to inform the transmitter of whether each message has been correctly received. Incorrectly received messages, as well as messages that aren't acknowledged at all, can then be re-transmitted.

Hybrid ARQ (HARQ), which can be understood as a refined form of ARQ, combines the basic ARQ techniques described above with forward error-correction (FEC) coding of the data messages, to improve the ability of the receiver to receive and correctly decode the transmitted messages. As with conventional ARQ, receivers employing HARQ send ACKs and NACKs, as appropriate, after each attempt to decode a message. These ACKs and NACKs are referred to as "HARQ feedback."

The fourth-generation system widely known as LTE (for Long-Term Evolution) and more formally known as the Evolved UMTS Terrestrial Radio-Access Network (E-UTRAN) has been developed and deployed by members of the $3^{rd}$-Generation Partnership Project (3GPP). For downlink transmissions in LTE today, HARQ feedback is sent from the UE (user equipment—3GPP terminology for a mobile terminal) to the network on either the Physical Uplink Control Channel (PUCCH) or the Physical Uplink Shared Channel (PUSCH), depending on whether or not the UE has been scheduled for uplink PUSCH transmission.

For each downlink transmission to the UE, the UE will transmit an ACK or NACK, depending on whether or not the transmission was correctly received. The network can, apart from detecting ACK or NACK, also draw the conclusion that the UE did not properly receive the corresponding downlink assignment, and thus did not even attempt to demodulate and decode the transmitted data message, if the network detects no feedback from the UE when anticipated. Note, however, that a missed ACK/NACK detection on the network side could also be due to the network's failure to receive it properly, even though it was transmitted by the UE.

A NACK received by the network will trigger a retransmission, whereas the reception of an ACK allows the corresponding HARQ transmit (Tx) process to be flushed and re-used. That a HARQ Tx process has been flushed and is being re-used is indicated to the UE from the network side by toggling the NDI (New Data Indicator) flag in the next downlink assignment for the corresponding HARQ process, along with the new data. This, in turn, will cause the UE to flush the HARQ receive (Rx) process and associate the newly received data with the current HARQ Rx process.

As described above, the failure of the network to receive an ACK/NACK from a UE when expected is an indication of a probable failure by the UE to correctly decode the downlink assignment message, which in LTE is sent on the Physical Downlink Control Channel (PDCCH) or enhanced PDCCH (ePDCCH). Detecting this condition at the network may thus be used for the purpose of PDCCH/ePDCCH link adaptation—i.e., for adapting the robustness of the physical control channel that carries the downlink grant.

While LTE is based on a fixed (or semi-static) division between uplink and downlink, other systems, as well as future versions of LTE, may be based on a dynamically scheduled division between uplink and downlink. In such systems, there may not be a one-to-one correspondence between downlink transmissions and HARQ feedback messages.

In upcoming enhancements of LTE, the assumed mode of operation is dynamic time-division duplexing (TDD), where subframes can be dynamically allocated for uplink or downlink use. With this approach, the number of HARQ processes may increase quite significantly, because, for example, a relatively large number of transmission-time-intervals (TTIs) in a row may be assigned to the downlink. This causes the number of needed HARQ processes to grow, since there is a long gap between feedback opportunities in the uplink, to free up HARQ processes.

SUMMARY

Given a downlink-heavy scenario for enhanced LTE systems using dynamic TDD, the TDD configuration will be such that many subframes are used for downlink usage while relatively few will be used for UL usage. Hence, HARQ feedback may be provided in the uplink relatively less frequently, which further increases the importance of their successful delivery. In addition, due to the large number of active HARQ Rx processes in the UE, for which feedback may be required at any given time, the HARQ feedback reports will be rather large. Some embodiments of the presently disclosed techniques address these problems by utilizing explicit requests for automatic repeat-request, ARQ, feedback, the request indicating one or more ARQ processes. In the LTE context, this ARQ feedback may be HARQ feedback, but it will be appreciated that the techniques described herein may be more generally applied to systems that support other forms of ARQ, with multiple simultaneous ARQ processes.

An example method, in a wireless device operating in a wireless communication network, includes receiving from the wireless communication network, in a first transmission-time interval, a request for automatic repeat-request, ARQ, feedback, the request indicating one or more ARQ processes. The method further includes transmitting to the wireless communication network, in a second transmission-time interval, ARQ feedback information for each of the one or more indicated ARQ processes. The request for ARQ feedback is received as part of or in association with a resource-assignment message allocating uplink resources to the wireless device, in some embodiments.

A corresponding example method, as might be implemented in a network node of a wireless communication network, includes transmitting to a wireless device, in a first transmission-time interval, a request for automatic repeat-request, ARQ, feedback, the request indicating one or more ARQ processes. This example method further includes receiving from the wireless device, in a second transmission-time interval, ARQ feedback information for each of the one or more indicated ARQ processes. Again, the request for ARQ feedback may be transmitted as part of or in association with a resource assignment message allocating uplink resources to the wireless device, in some embodiments.

In the detailed description that follows, several embodiments are described in detail. Following the detailed description is a listing of example embodiments of the techniques and apparatus disclosed herein. It should be appreciated however, that this listing of example embodiments is intended to be illustrative, and not exhaustive.

DETAILED DESCRIPTION

Figure 1:
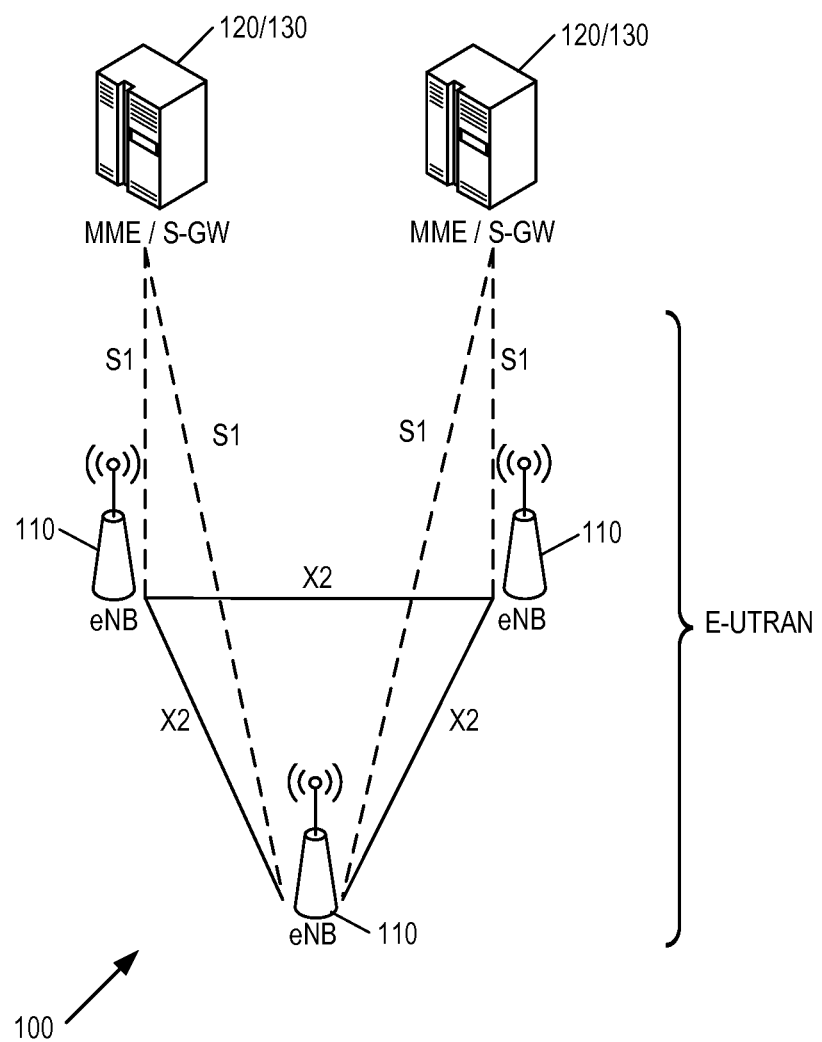
FIG. 1 illustrates components of an example wireless network.

Inventive concepts will now be described more fully hereinafter with reference to the accompanying drawings, in which examples of embodiments of inventive concepts are shown. These inventive concepts may, however, be embodied in many different forms and should not be construed as limited to the embodiments set forth herein. Rather, these embodiments are provided so that this disclosure will be thorough and complete, and fully convey the scope of present inventive concepts to those skilled in the art. It should also be noted that these embodiments are not mutually exclusive. Components from one embodiment may be tacitly assumed to be present or used in another embodiment.

For purposes of illustration and explanation only, some embodiments of the present inventive concepts are described herein in the context of operating in or in association with a Radio-Access Network (RAN) that communicates over radio communication channels with mobile terminals (also referred to as wireless terminals or UEs).

In some embodiments of a RAN, several base stations may be connected (e.g., by landlines or radio channels) to a radio network controller (RNC). A radio network controller, also sometimes termed a base station controller (BSC), may supervise and coordinate various activities of the plural base stations connected thereto. A radio network controller may be connected to one or more core networks. According to some other embodiments of a RAN, base stations may be connected to one or more core networks without an intervening RNC, for example, with the functionality of an RNC implemented at base stations and/or in the core network.

As used herein, the terms "mobile terminal," "wireless terminal," "user equipment," or "UE" may be used to refer to any device that receives data from and transmits data to a communication network, any of which may be, for example, a mobile telephone ("cellular" telephone), laptop/portable computer, pocket computer, hand-held computer, desktop computer, a machine-to-machine (M2M) or machine-type-communications (MTC) type device, a sensor with a wireless communication interface, etc. Note that although terminology from specifications for the Long-Term Evolution (LTE), also referred to as the Evolved Universal Terrestrial Radio-Access Network, or E-UTRAN, and/or the Universal Mobile Telecommunications System (UMTS) is used in this disclosure to exemplify embodiments of the inventive concepts, this should not be seen as limiting the scope of the presently disclosed techniques to only these systems. Devices designed for use in other wireless systems, including variations and successors of 3GPP LTE and WCDMA systems, WiMAX (Worldwide Interoperability for Microwave Access), UMB (Ultra Mobile Broadband), HSDPA (High-Speed Downlink Packet Access), GSM (Global System for Mobile Communications), etc., may also benefit from exploiting embodiments of present inventive concepts disclosed herein.

Also note that terminology such as "base station" (also referred to as a NodeB, eNodeB, or Evolved Node B) and "wireless terminal" or "mobile terminal" (also referred to as User Equipment node or UE) should be considering non-limiting, and unless the context clearly indicates otherwise, does not imply a particular hierarchical relation between the two. In general, a base station (e.g., a "NodeB" or "eNodeB") and a wireless terminal (e.g., a "UE") may be considered as examples of respective different communications devices that communicate with each other over a wireless radio channel. Thus, for example, while certain techniques described herein may be described as specifically applicable to the downlink or uplink, it should be understood that the same or similar techniques may be applicable to the uplink as well, in the same network or in other networks. Similarly, those skilled in the art will also appreciate that some of these techniques described with respect to a particular direction herein may in some cases apply to either direction in a peer-to-peer or ad hoc network scenario.

Likewise, specific examples of the techniques and apparatus described here are described in the context of the LTE system, which utilizes multi-process HARQ. It should be understood that the inventive techniques described herein may also be applied to systems that use other forms of ARQ.

The Evolved UMTS Terrestrial Radio-Access Network (E-UTRAN) includes base stations called enhanced NodeBs (eNBs or eNodeBs), providing the E-UTRA user plane and control plane protocol terminations towards the UE. The eNBs are interconnected with each other using the X2 interface. The eNBs are also connected, using the S1 interface to the EPC (Evolved Packet Core). More specifically, the eNBs are connected to the MME (Mobility Management Entity) by means of the S1-MME interface and to the Serving Gateway (S-GW) by means of the S1-U interface. The S1 interface supports many-to-many relation between MMEs/S-GWs and eNBs. A simplified view of the E-UTRAN architecture is illustrated in FIG. 1.

The illustrated network 100 includes eNBs 110, which host functionalities such as Radio-Resource Management (RRM), radio bearer control, admission control, header compression of user-plane data towards a serving gateway, and/or routing of user-plane data towards the serving gateway. The MMEs 120 are the control nodes that process the signaling between UEs and the CN (core network). Significant functions of the MMEs 120 are related to connection management and bearer management, which are handled via Non-Access Stratum (NAS) protocols. The S-GWs 130 are the anchor points for UE mobility, and also includes other functionalities such as temporary downlink data buffering while the UE is being paged, packet routing and forwarding to the right eNB, and/or gathering of information for charging and lawful interception. The PDN Gateway (P-GW, not shown in FIG. 1) is the node responsible for UE IP address allocation, as well as Quality-of-Service (QoS) enforcement (as further discussed below). The reader is referred to version 12.3.0 of 3GPP TS 36.300, available at www.3gpp.org/dynareport/36300.htm, and the references therein for further details of functionalities of the different nodes.

Figure 2:
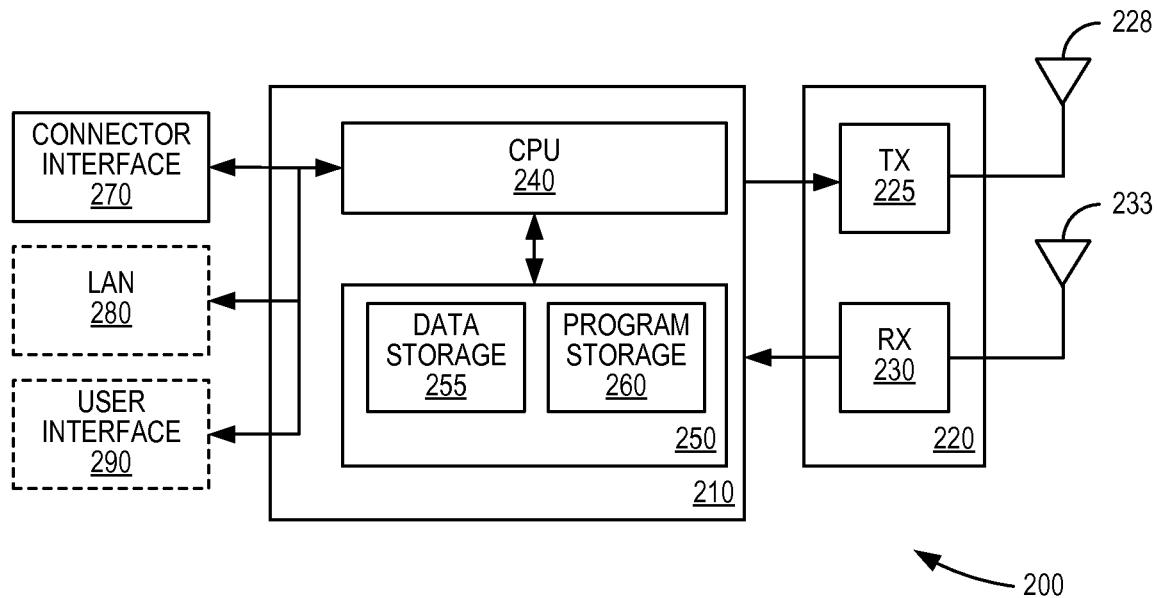
FIG. 2 is a block diagram illustrating components of a wireless device, according to some embodiments of the disclosed techniques and apparatus.

Several of the techniques and methods described herein are implemented using radio circuitry, electronic data processing circuitry, and other electronic hardware provided in a mobile terminal or other wireless device. FIG. 2 illustrates features of an example mobile terminal 200 according to several embodiments of the present invention. Mobile terminal 200, which may be a UE configured for operation with an LTE wireless communication network (E-UTRAN), for example, as well as for operation in a device-to-device mode, in some embodiments, comprises a radio transceiver circuit 220 configured to communicate with one or more base stations as well as a processing circuit 210 configured to process the signals transmitted and received by the transceiver unit 220. Transceiver circuit 220 includes a transmitter 225 coupled to one or more transmit antennas 228 and receiver 230 coupled to one or more receiver antennas 233. The same antenna(s) 228 and 233 may be used for both transmission and reception.

Receiver 230 and transmitter 225 use known radio-processing and signal-processing components and techniques, typically according to a particular telecommunications standard such as the 3GPP standards for LTE. Note also that transceiver circuit 220 may comprise separate radio and/or baseband circuitry for each of two or more different types of radio-access network, in some embodiments. The same applies to the antennas—while in some cases one or more antennas may be used for accessing multiple types of networks, in other cases one or more antennas may be specifically adapted to a particular radio-access network or networks. Because the various details and engineering tradeoffs associated with the design and implementation of such circuitry are well known and are unnecessary to a full understanding of the invention, additional details are not shown here.

Processing circuit 210 comprises one or more processors 240 coupled to one or more memory devices 250 that make up a data-storage memory 255 and a program-storage memory 260. Processor 240, identified as CPU 240 in FIG. 6, may be a microprocessor, microcontroller, or digital signal processor, in some embodiments. More generally, processing circuit 210 may comprise a processor/firmware combination, or specialized digital hardware, or a combination thereof. Memory 250 may comprise one or several types of memory such as read-only memory (ROM), random-access memory, cache memory, flash-memory devices, optical-storage devices, etc. Because terminal 200 may support multiple radio-access networks, including, for example, a wide-area RAN such as LTE as well as a wireless local-area network (WLAN), processing circuit 210 may include separate processing resources dedicated to one or several radio-access technologies, in some embodiments. Again, because the various details and engineering tradeoffs associated with the design of baseband processing circuitry for mobile devices are well known and are unnecessary to a full understanding of the invention, additional details are not shown here.

Typical functions of the processing circuit 210 include modulation and coding of transmitted signals and the demodulation and decoding of received signals. In several embodiments of the present invention, processing circuit 210 is adapted, using suitable program code stored in program-storage memory 260, for example, to carry out one of the techniques specifically described herein, including, for example, one or more of the techniques illustrated in FIGS. 4, 5, and 6, and variants thereof. Of course, it will be appreciated that not all of the steps of these techniques are necessarily performed in a single microprocessor or even in a single module.

Mobile terminal 200 may further include one or more additional interface circuits, depending on the specific application for the unit. Typically, mobile terminal 200 includes connector interface circuitry 270. In some embodiments, connector interface circuitry 270 may consist of no more than electrical terminals and associated hardware to support charging of an on-board battery (not shown) or to provide direct-current (DC) power to the illustrated circuits. More often, connector interface circuitry 270 further includes a wired communication and/or control interface, which may operate according to proprietary signaling and message formats in some embodiments, or according to a standardized interface definition, in others. For example, connector interface 270 may comprise electrical terminals and associated hardware for support of the well-known Universal Serial Bus (USB) interface. It will be appreciated that while connector interface circuitry 270 includes at least the necessary receiver and driver circuits to support such an interface and may further comprise specialized hardware/firmware, part of the interface functionality may be provided by CPU 240, configured with appropriate firmware and/or software in memory 250, in some embodiments.

Mobile terminal 200 may further comprise local-area network (LAN) interface circuitry 280, in some embodiments. In some embodiments, for example, LAN interface circuitry 280 may provide support for wireless LAN (WLAN) functionality, such as according to the well-known Wi-Fi standards. In some such embodiments, LAN interface circuitry 280 may include an appropriate antenna or antennas. In other embodiments, LAN interface circuitry 280 may make use of one or more common antenna structures that provide reception and/or transmission of WLAN signals as well as wide-area RAN signals. In some embodiments, LAN interface circuitry 280 may be relatively self-contained, in that it includes all of the necessary hardware, firmware, and/or software to carry out the LAN functionality, including the associated protocol stacks. In other embodiments, at least parts of the LAN functionality may be carried out by processing circuit 210.

Figure 3:
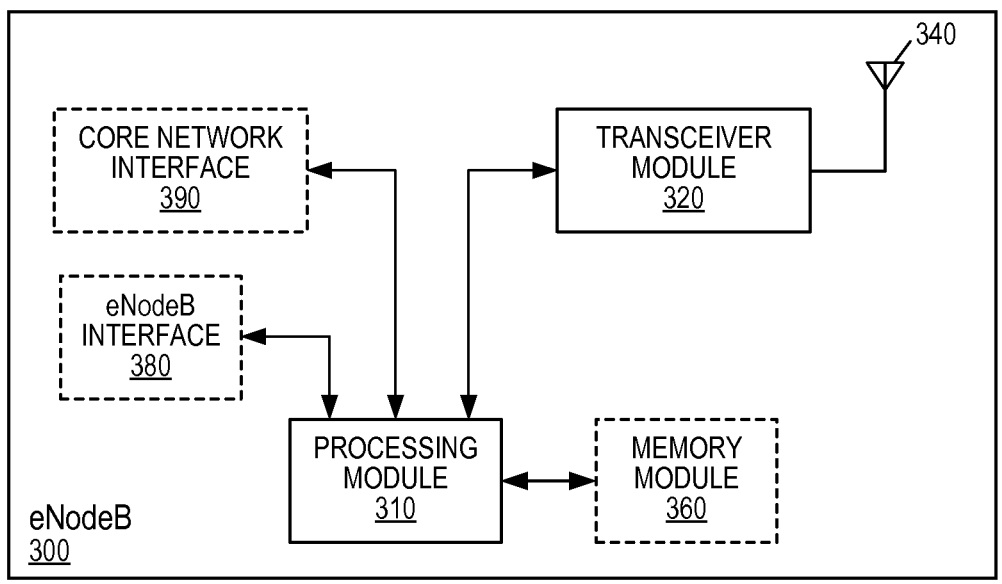
FIG. 3 is a block diagram illustrating components of an example base station, according to some embodiments of the disclosed techniques and apparatus.

Still further, mobile terminal 200 may include user-interface circuitry 290, which may include, for example, circuitry and/or associated hardware for one or more switches, pushbuttons, keypads, touch screens, and the like, for user input, as well as one or more speakers and/or displays for output. Of course, some mobile terminals, such as those developed for machine-to-machine applications or for insertion into another device (e.g., a laptop computer) may have only a subset of these input/output devices, or none at all. FIG. 3 shows an example wireless network node, in this case a base station 300 (for example a NodeB or an eNodeB), that can be used in some of the example embodiments described herein. It will be appreciated that although a macro eNB will not, in practice, be identical in size and structure to a micro eNB, for the purposes of illustration, the base stations 300 in both cases are assumed to include similar components. Thus, whether or not base station 300 corresponds to a macro base station or a micro base station, it comprises a processing module 310 that controls the operation of the base station 300. The processing module 310, which may include one or more microprocessors, microcontrollers, digital signal processors, specialized digital logic, etc., is connected to a transceiver module 320 with associated antenna(s) 340 that are used to transmit signals to, and receive signals from, UEs 200 when operating in a network like that illustrated in FIG. 1. The base station 300 also comprises a memory circuit 360 that is connected to the processing module 310 and that stores program and other information and data required for the operation of the base station 300. Together, the processing module 310 and memory circuit 360 may be referred to as a "processing circuit," and are adapted, in various embodiments, to carry out one or more of the network-based techniques described below.

Base station 300 also includes an eNodeB interface circuit 380, which comprises components and/or circuitry for allowing the base station 300 to exchange information with other base stations 300 (for example, via an X2 interface), and further includes a core network interface circuit 390, which comprises components and/or circuitry for allowing the base station 300 to exchange information with nodes in the core network (for example, via the S1 interface), such as with an MME 120 or S-GW 130, as illustrated in FIG. 1. It will be appreciated that base stations for use in other types of network (e.g., UTRAN or WCDMA RAN) will include similar components to those shown in FIG. 3 and appropriate interface circuitry 380, 390 for enabling communications with the other network nodes in those types of networks (e.g., other base stations, mobility management nodes and/or nodes in the core network).

Figure 4:
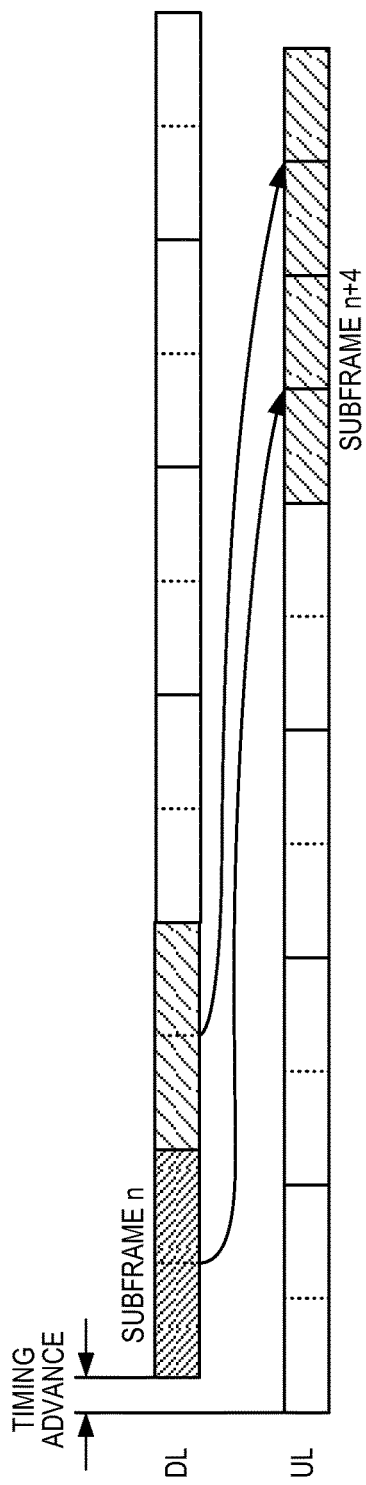
FIG. 4 illustrates the timing of conventional HARQ feedback in an LTE system.

As discussed above, current LTE systems use HARQ for downlink transmissions, with HARQ feedback being sent by the UE in the uplink. Downlink scheduling is done on a 1-millisecond subframe basis. The scheduling messages are sent each subframe, and the granted resource occupies all of the orthogonal frequency-division multiplexing (OFDM) symbols allocated to the PDSCH in the resource-block pairs allocated to the UE in the downlink resource grant. The processing time allowed to the terminal for completing all processing related to a transmission in a given subframe is 3 milliseconds, less the timing advance, which is a transmit-timing adjustment to account for the propagation delay between the terminal and the base station. The specifications for LTE thus specify that the ACK/NACK in response to a PDSCH transmission in subframe n should be transmitted in the UL in subframe n+4, no matter the size of the transport block or the number of additional downlink resource grants. This is illustrated in FIG. 4. Variations of this general synchronous scheme have been developed to accommodate time-division duplexing (TDD) operation and carrier-aggregation techniques, either of which can require that ACK/NACK for multiple subframes and/or carriers be transmitted in a single uplink subframe.

As discussed above, future LTE systems (and other wireless systems) may use dynamic TDD, in which subframes (or other transmission time intervals, TTIs) may be designated for downlink or uplink use on a dynamic basic. Given a downlink-heavy scenario for enhanced LTE systems that use dynamic TDD, the TDD usage will be such that many subframes are configured for downlink usage while relatively few will be configured for UL usage. Hence, HARQ feedback may be provided in the uplink relatively less frequently, which further increases the importance of their successful delivery. In addition, due to the large number of active HARQ Rx processes in the UE for which feedback may be required at any given time, the HARQ feedback reports will be rather large.

For the network to be able to have full control over the HARQ feedback provided, it would hence be desirable:

a) for the network to be able to explicitly request HARQ feedback from the UE, for specific HARQ processes;

b) to be able to do multiple request attempts for the same HARQ process, in the event that a report is not successfully received;

c) to limit the reported HARQ processes to only those actually used; and d) to relax the UE downlink processing-time constraints by postponing the request the desirable amount of extra processing time.

None of these is, however, possible under the 3GPP LTE standard as of today, since HARQ feedback is synchronous and only transmitted once per transmission attempt.

According to some embodiments of the presently disclosed techniques, these problems are addressed by allowing the network to explicitly request HARQ feedback (or, more generally, ARQ feedback) from active HARQ processes (or, more generally, ARQ processes), i.e., for those processes for which the network has attempted a transmission and possibly subsequent retransmissions. The request is done dynamically, e.g., with explicit control signaling. This can be done, for example, by letting each transmitted UL Scheduling Grant contain an additional field indicating whether HARQ feedback is requested and, if so, which HARQ Rx processes should be reported status for. In some embodiments, there could also be an independent scheduling grant carrying the HARQ request.

The addressing of the individual HARQ Rx processes for which status should be reported could be done either: a) explicitly, e.g., by a bitmap; or b) by defining a set of rules that specify in which order the HARQ processes shall be populated and then only indicating a total number of HARQ process for which feedback is requested; or c) by specifying a range of subframes in the UL grant, and the UE then reporting all HARQ processes received in those subframes. An explicit indication of the HARQ RX process for which status should be reported could comprise an indicated range of processes, where the range is indicated, for example, by a starting HARQ process identifier and a number of HARQ processes, or by starting and ending HARQ process identifiers.

By allowing the network to explicitly request HARQ feedback for specific HARQ processes, rather than letting the UE provide it autonomously, better control is achieved in the HARQ feedback reporting. This enables the network to know, with much higher reliability, which HARQ processes really require a retransmission, thus reducing wasteful retransmissions on other HARQ processes due to incomplete HARQ information.

Furthermore, in systems that use redundancy versions for re-transmissions, whereby different combinations of encoded bits and forward-error-correction bits are transmitted in each retransmission of a block of data, the optimal redundancy version of the retransmission can be chosen with a much higher probability.

The better HARQ control also makes the system less vulnerable to undetected downlink grants, i.e., decoding failures of the PDCCH/ePDCCH, especially for retransmissions.

In addition, by making sure to provide feedback on not all but only the required subset of HARQ Rx processes, the size of the HARQ reports are reduced and hence uplink transmission resources are saved.

According to several embodiments of the presently disclosed techniques, the problems described above are addressed with a solution in which a signal is transmitted from the network to the UE, requesting HARQ feedback for certain indicated HARQ processes. This approach solves the problem with irregular HARQ feedback for dynamic TDD while also providing a mechanism for robust HARQ reporting, by enabling retransmission of the feedback in the event that it is not correctly received by the network. This asynchronous "on-demand" reporting approach also allows for relaxed processing-time constraints in the UE.

According to some embodiments of the presently disclosed techniques, the UL Scheduling Grant message is amended with a 'HARQ Feedback Request' field used to explicitly indicate that HARQ feedback is requested for the HARQ Rx processes in the UE. The Scheduling Grant message could either be used for regular uplink data transmission or as a specific grant dedicated to scheduling uplink control information. In the latter case, the scheduling grant could be included in a downlink scheduling assignment. The reception of such a field then triggers the UE to transmit HARQ feedback to the network.

Figure 5:
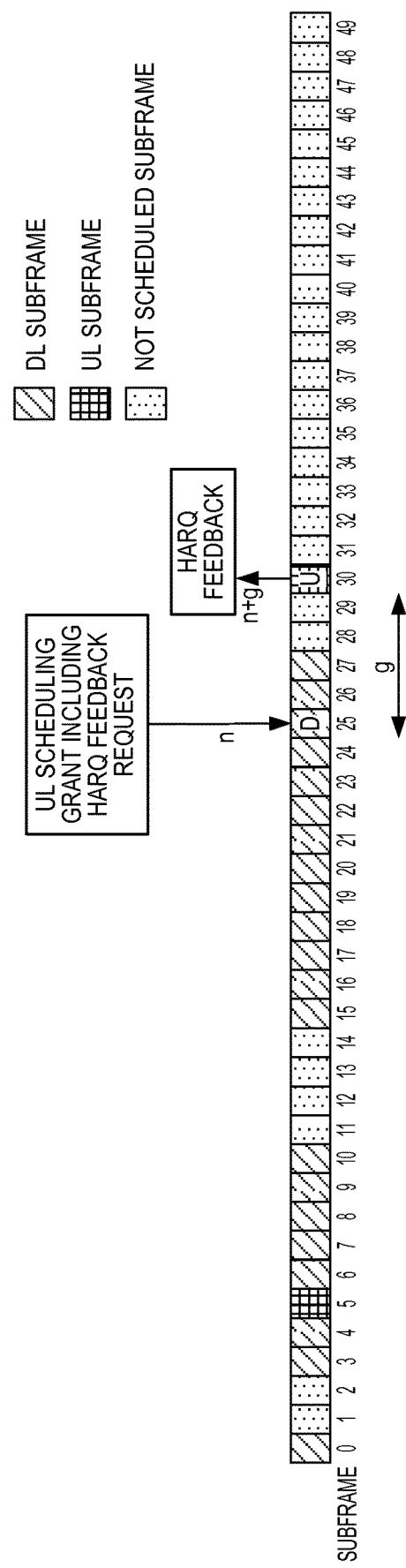
FIG. 5 illustrates an example downlink HARQ transmission, followed by a request for and transmission of HARQ feedback.

An example of a HARQ feedback process according to this approach for one HARQ process—inclusive of the successful reception of the downlink Assignment, downlink data, uplink grant, and the transmission of the HARQ feedback—is shown in FIG. 5.

Downlink assignments (DL Assignments) for a given UE are transmitted in downlink subframes, using the PDCCH or ePDCCH. Each of these DL assignments alerts the UE to the transmission of downlink data for the UE, on the Physical Downlink Shared Channel (PDSCH). As seen in the figure, at some point after a particular downlink transmission, an uplink grant (UL grant) for the same UE is transmitted on the downlink, again using the PDCCH or ePDCCH. This UL grant, which is shown at subframe 25 in FIG. 5, includes a HARQ feedback request. A certain number (g) of subframes later, the UE transmits HARQ feedback corresponding to one or more HARQ processes, which each corresponds to earlier downlink transmissions to the UE.

In the example shown in FIG. 5, the delay from reception of the HARQ Feedback Request until transmission of the HARQ feedback is denoted by g; this parameter may be system dependent, in some embodiments. It should be appreciated that FIG. 5 illustrates a single HARQ process. In LTE and in other systems, several processes may be active simultaneously, so that the system need not wait until a HARQ process is concluded before scheduling and sending additional data to the UE.

In some embodiments, the UL grant comprises a 'HARQ Feedback Request' field, which is included in an existing Downlink Control Information (DCI) format used for uplink scheduling grants (i.e., DCI format 0 or 4). This would be done by augmenting the existing formats with additional fields. In other embodiments, the 'HARQ Feedback Request' field is included in a new DCI format to be used for uplink scheduling grants in addition to the DCI formats 0 and 4 that are available today. In still other embodiments, the 'HARQ Feedback Request' field is included in one or more existing DCI formats used for downlink scheduling assignments. This would be done by augmenting the formats with additional fields. In yet other embodiments, the 'HARQ feedback request' is signaled by providing the UE with an additional Radio Network Temporary Identifier (RNTI) used for this purpose. Whenever this new RNTI is used in a DCI message, bits belonging to existing fields in the existing DCI formats may be reused for the additional information required for the 'HARQ feedback request'.

The contents of the 'HARQ Feedback Request' field may vary from one embodiment of the present techniques to another. In some embodiments, the 'HARQ Feedback Request' field is a one-bit field indicating simply whether HARQ Feedback is requested or not. This would indicate to the UE that feedback for all HARQ processes is requested. In other embodiments, the 'HARQ Feedback Request' field is a bitmap of size equal to the total number of HARQ processes. Assuming this to be T, then this bitmap may be indexed for 0 . . . T−1, such that a set bit (e.g., a bit value of 1) at index t in this bitmap means that feedback is requested for HARQ process with index t. Similarly, a clear bit (e.g., a bit value of 0) at a certain point in the bitmap means that no feedback shall be provided for the HARQ process that corresponds to that point.

In still other embodiments, the 'HARQ Feedback Request' field is encoded to indicate information on a particular number of HARQ processes that the UE should provide feedback for. As one example, it could be encoded as a 2-bit information field to be interpreted as {0, 2, 20, All}. In this case, 'All' means that all HARQ processes shall be reported, while '0' means that no report shall be sent. For this to be fully usable, it is also required that the network ensures that HARQ processes are used in a predefined order, such as, e.g., always allocating the free HARQ process that has the lowest index number. The network then also needs to ensure that whatever HARQ processes are ongoing at the time of a reconfiguration before the request have had time to finish, in order to avoid confusion.

In some embodiments, the 'HARQ Feedback Request' is requested for a single or multiple selected processes by providing the actual HARQ process number(s). In some embodiments, the 'HARQ Feedback Request' field indicates a range of processes. Thus, for example, it may have a format that includes a start value t and a range r, indicating to the UE that the HARQ processes numbered from t to t+r−1 should be reported.

In still other embodiments, the 'HARQ Feedback Request' field indicates a range of subframes, thus indicating a set corresponding HARQ Rx processes, received within that range, for which feedback should be reported. Thus, for example, the 'HARQ Feedback Request' in some of these embodiments may include the last requested subframe k expressed as an offset from the granted received subframe n, and also include the number of subframes m to be included in the report. All subframes from n+k−m−1 to n+k would then be reported.

In various embodiments, the HARQ feedback transmitted by the UE may include explicit identifiers of the HARQ Rx processes for which feedback is reported. In some embodiments, the transmitted HARQ feedback may include a 'ReportSFN' Timestamp, indicating a subframe number for each of one or more of the HARQ processes for which feedback is reported.

Figure 6:
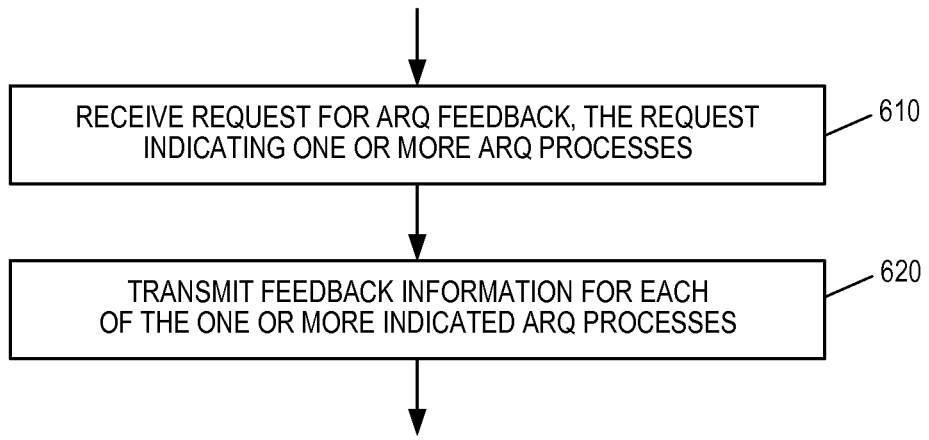
FIG. 6 is a process flow diagram illustrating an example method.

Given the above detailed examples of techniques for HARQ feedback reporting and processing, it should be appreciated that these techniques may be applied more generally. FIG. 6 illustrates an example method that may be carried out in a wireless device operating in a wireless communication network, such as a UE operating in an enhanced LTE wireless network.

As shown at block 610, the illustrated method includes receiving from the wireless communication network, in a first transmission-time interval, a request for automatic repeat-request (ARQ) feedback. The request indicates one or more ARQ processes. As shown at block 620, the method further includes transmitting to the wireless communication network, in a second transmission-time interval, ARQ feedback information for each of the one or more indicated ARQ processes.

In some embodiments, the request for ARQ feedback is received as part of or in association with a resource assignment message allocating downlink resources to the wireless device. In other embodiments, the request for ARQ feedback is received as part of or in association with a resource assignment message allocating uplink resources to the wireless device. In some of these latter embodiments, the resource assignment message may allocate uplink resources for transmitting the ARQ feedback information. In some embodiments, the wireless communication network is an E-UTRAN network and the resource assignment message comprises a Downlink Control Information (DCI) format 0 message or a DCI format 4 message, augmented with one or more fields for carrying the request for ARQ feedback.

In some embodiments, the request for ARQ feedback is received in a resource allocation message that includes a Radio Network Temporary Identifier (RNTI) for the wireless device that indicates that the resource allocation message contains the request for ARQ feedback.

Various techniques may be used to indicate the ARQ processes for which ARQ feedback should be provided. For instance, in some embodiments, the request for ARQ feedback comprises a one-bit field indicating whether or not ARQ feedback for all ARQ processes is requested. Other possibilities include that the request for ARQ feedback: includes a bitmap, such that each bit in the bitmap corresponds to a particular one of a plurality of ARQ processes and indicates whether feedback is requested for the corresponding ARQ process; indicates a number of ARQ processes for which the wireless device is to provide feedback; indicates one or more specific ARQ process numbers; indicates a specific range of ARQ process numbers; or indicates a range of transmit-time intervals, indicating that the wireless device is to provide ARQ feedback for all ARQ processes active during the indicated range of transmit-time intervals.

Figure 7:
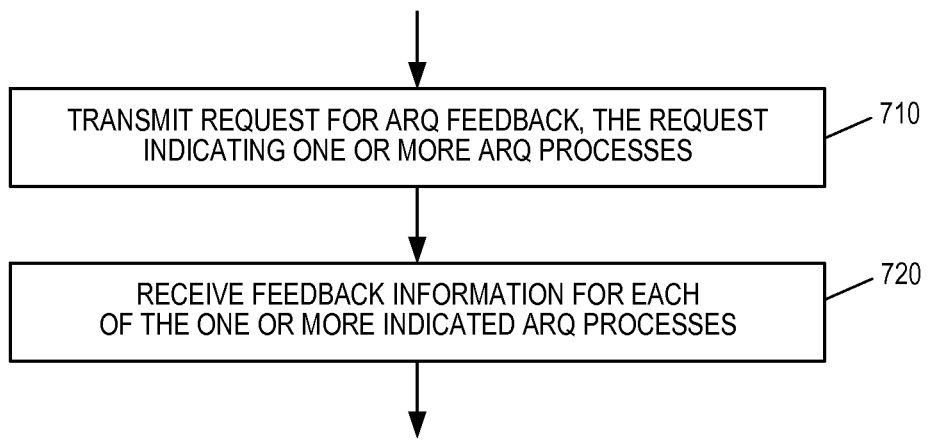
FIG. 7 is a process flow diagram illustrating another example method.

FIG. 7 illustrates an example method that may be carried out in a network node of a wireless communication network, such as a base station (eNodeB) operating in an enhanced LTE wireless network. It will be appreciated that the method of FIG. 7 is complementary to but corresponds closely to the example method shown in FIG. 6.

As shown at block 710, the illustrated method includes transmitting to a wireless device, in a first transmission-time interval, a request for automatic repeat-request (ARQ) feedback. The request indicates one or more ARQ processes. As shown at block 720, the method further includes receiving from the wireless device, in a second transmission-time interval, ARQ feedback information for each of the one or more indicated ARQ processes.

In some embodiments, the request for ARQ feedback is transmitted as part of or in association with a resource assignment message allocating downlink resources to the wireless device. In other embodiments, the request for ARQ feedback is transmitted as part of or in association with a resource assignment message allocating uplink resources to the wireless device. In some of these latter embodiments, the resource assignment message may allocate uplink resources for transmitting the ARQ feedback information. In some embodiments, the wireless communication network is an E-UTRAN network and the resource assignment message comprises a Downlink Control Information (DCI) format 0 message or a DCI format 4 message, augmented with one or more fields for carrying the request for ARQ feedback.

In some embodiments, the request for ARQ feedback is transmitted in a resource allocation message that includes a Radio Network Temporary Identifier (RNTI) for the wireless device that indicates that the resource allocation message contains the request for ARQ feedback.

Once again, various techniques may be used to indicate the ARQ processes for which ARQ feedback should be provided. For instance, in some embodiments, the request for ARQ feedback comprises a one-bit field indicating whether or not ARQ feedback for all ARQ processes is requested. Other possibilities include that the request for ARQ feedback: includes a bitmap, such that each bit in the bitmap corresponds to a particular one of a plurality of ARQ processes and indicates whether feedback is requested for the corresponding ARQ process; indicates a number of ARQ processes for which the wireless device is to provide feedback; indicates one or more specific ARQ process numbers; indicates a specific range of ARQ process numbers; or indicates a range of transmit-time intervals, indicating that the wireless device is to provide ARQ feedback for all ARQ processes active during the indicated range of transmit-time intervals.

Embodiments of the presently disclosed techniques include the several methods described above, including the methods illustrated in the process flow diagrams of FIGS. 6 and 7, as well as variants thereof. Other embodiments include mobile terminal apparatus and corresponding network node configured to carry out one or more of these methods. In some embodiments of the invention, processing circuits, such as the processing circuit 210 in FIG. 2 or the processing module 310 and memory circuit 360 of FIG. 3, are configured to carry out one or more of the techniques described in detail above. Likewise, other embodiments may include mobile terminals and network nodes that include one or more such processing circuits. In some cases, these processing circuits are configured with appropriate program code, stored in one or more suitable memory devices, to implement one or more of the techniques described herein. Of course, it will be appreciated that not all of the steps of these techniques are necessarily performed in a single microprocessor or even in a single module.

It will further be appreciated that various aspects of the above-described embodiments can be understood as being carried out by functional "modules" corresponding to the method steps illustrated in FIGS. 6 and 7. These functional modules may be program instructions executing on an appropriate processor circuit, hard-coded digital circuitry and/or analog circuitry, or appropriate combinations thereof, e.g., in network nodes and wireless devices having hardware configurations like those shown in FIGS. 2 and 3.

Figure 8:
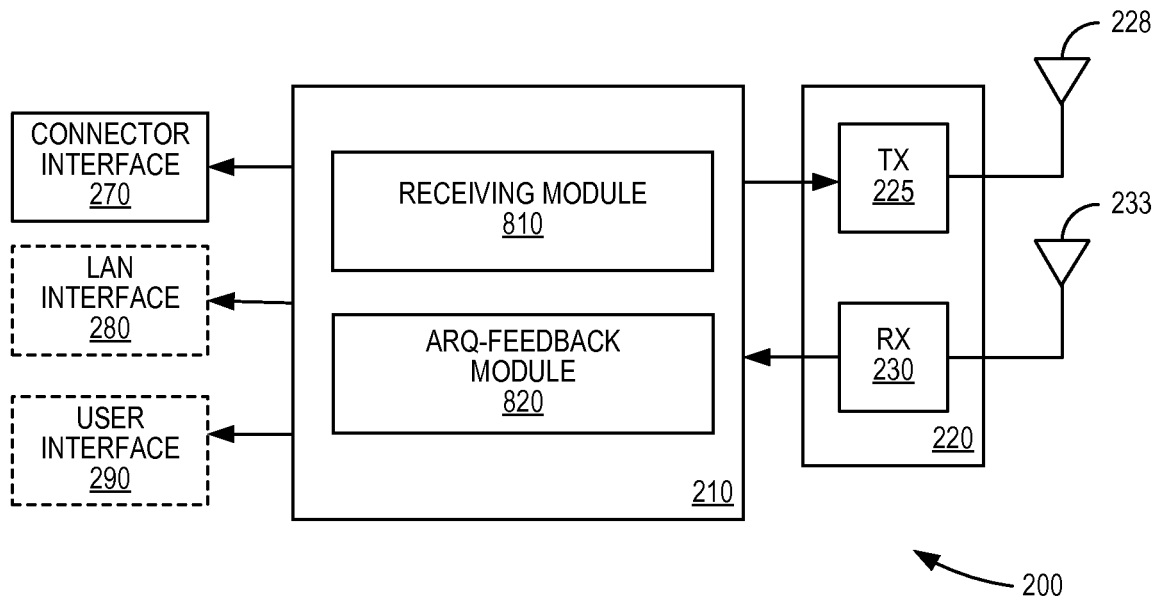
FIG. 8 is a block diagram providing another view of an example wireless device.

For example, FIG. 8 is a block diagram illustrating another view of the example wireless device 200 shown in FIG. 2, but where the processing circuit is illustrated according to this functional view. In FIG. 8, processing circuitry 210 comprises a receiving module 810, which is adapted to receive from a wireless communication network, in a first transmission-time interval, a request for automatic repeat-request (ARQ) feedback, the request indicating one or more ARQ processes. The processing circuitry 210 further comprises a ARQ feedback module 820, which is adapted to transmit to the wireless communication network, in a second transmission-time interval, ARQ feedback information for each of the one or more indicated ARQ processes.

Figure 9:
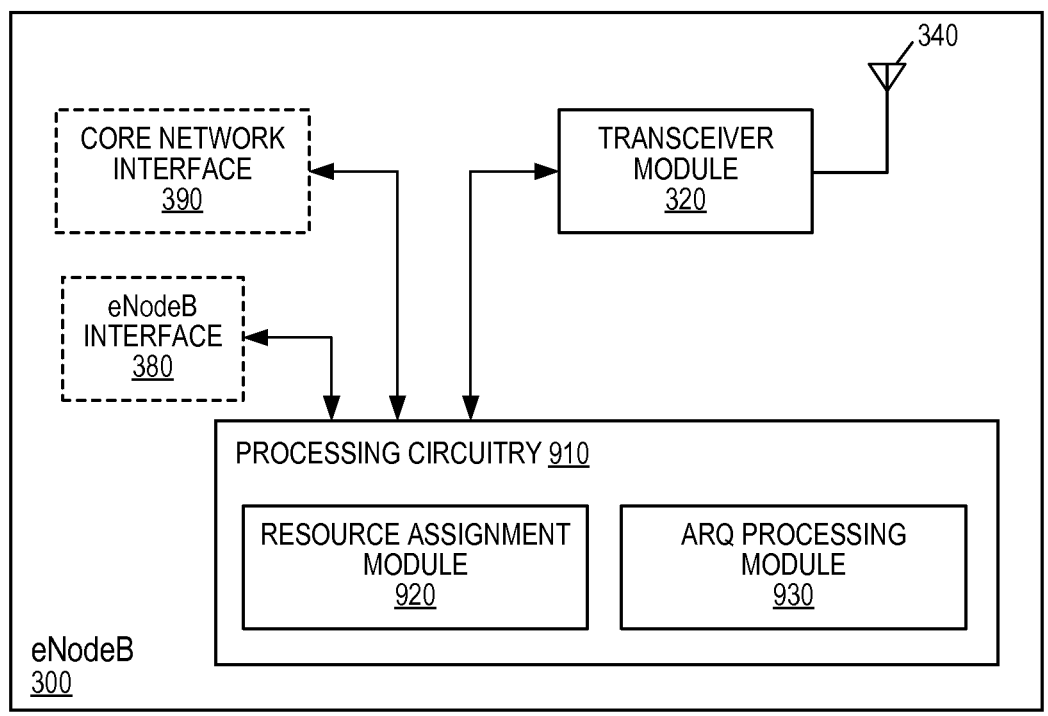
FIG. 9 is a block diagram providing another view of an example base station.

Similarly, FIG. 9 is a block diagram illustrating another view of the example base station 300 depicted in FIG. 3, but where the processing circuit of base station 300 is illustrated according to a functional view. In FIG. 9, a processing circuit 910 comprises a feedback request module 920, which is adapted to transmit to a wireless device, in a first transmission-time interval, a request for automatic repeat-request (ARQ) feedback, the request indicating one or more ARQ processes. Processing circuit 910 further comprises a ARQ processing module 930 configured to receive from the wireless device, in a second transmission-time interval, ARQ feedback information for each of the one or more indicated ARQ processes. It will be appreciated by the person of skill in the art that various modifications may be made to the above described embodiments without departing from the scope of the present invention. For example, although embodiments of the present invention have been described with examples that reference a communication system compliant to the 3GPP-specified LTE standards, it should be noted that the solutions presented may be equally well applicable to other networks. The specific embodiments described above should therefore be considered exemplary rather than limiting the scope of the invention. Because it is not possible, of course, to describe every conceivable combination of components or techniques, those skilled in the art will appreciate that the present invention can be implemented in other ways than those specifically set forth herein, without departing from essential characteristics of the invention. The present embodiments are thus to be considered in all respects as illustrative and not restrictive.

In the present description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but do not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments have been described herein, with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general-purpose computer circuit, special-purpose computer circuit, and/or other programmable data-processing circuit to produce a machine, such that the instructions, which execute via the processor of the computer and/or other programmable data-processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data-processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) running on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure, and shall not be restricted or limited by the foregoing detailed description.

EXAMPLE EMBODIMENTS

Embodiments of the presently disclosed techniques and apparatus include, but are not limited to, the following:

(a) A method, in a wireless device operating in a wireless communication network, the method comprising:
 receiving from the wireless communication network, in a first transmission-time interval, a request for hybrid automatic repeat-request (HARQ) feedback, the request indicating one or more HARQ processes; and
 transmitting to the wireless communication network, in a second transmission-time interval, HARQ feedback information for each of the one or more indicated HARQ processes.

(b) The method of example embodiment (a), wherein the request for HARQ feedback is received as part of or in association with a resource assignment message allocating uplink resources to the wireless device.

(c) The method of example embodiment (b), wherein the resource assignment message allocates uplink resources for transmitting the HARQ feedback information.

(d) The method of example embodiment (b) or (c), wherein the wireless communication network is an E-UTRAN network and wherein the resource assignment message comprises a Downlink Control Information (DCI) format 0 message or a DCI format 4 message, augmented with one or more fields for carrying the request for HARQ feedback.

(e) The method of example embodiment (a), wherein the request for HARQ feedback is received as part of or in association with a resource assignment message allocating downlink resources to the wireless device.

(f) The method of any of example embodiments (a)-(e), wherein the request for HARQ feedback is received in a resource allocation message that includes a Radio Network Temporary Identifier (RNTI) for the wireless device that indicates that the resource allocation message contains the request for HARQ feedback.

(g) The method of any of example embodiments (a)-(f), wherein the request for HARQ feedback comprises a one-bit field indicating whether or not HARQ feedback for all HARQ processes is requested.

(h) The method of any of example embodiments (a)-(f), wherein the request for HARQ feedback comprises a bit-map, such that each bit in the bitmap corresponds to a particular one of a plurality of HARQ processes and indicates whether feedback is requested for the corresponding HARQ process.

(i) The method of any of example embodiments (a)-(f), wherein the request for HARQ feedback indicates a number of HARQ processes for which the wireless device is to provide feedback.

(j) The method of any of example embodiments (a)-(f), wherein the request for HARQ feedback indicates one or more specific HARQ process numbers.

(k) The method of any of example embodiments (a)-(f), wherein the request for HARQ feedback indicates a specific range of HARQ process numbers.

(l) The method of any of example embodiments (a)-(f), wherein the request for HARQ feedback indicates a range of transmit-time intervals, indicating that the wireless device is to provide HARQ feedback for all HARQ processes active during the indicated range of transmit-time intervals.

(m) A method, in a network node of a wireless communication network, the method comprising:
 transmitting to a wireless device, in a first transmission-time interval, a request for hybrid automatic repeat-request (HARQ) feedback, the request indicating one or more HARQ processes; and
 receiving from the wireless device, in a second transmission-time interval, HARQ feedback information for each of the one or more indicated HARQ processes.

(n) The method of example embodiment (m), wherein the request for HARQ feedback is transmitted as part of or in association with a resource assignment message allocating uplink resources to the wireless device.

(o) The method of example embodiment (n), wherein the resource assignment message allocates uplink resources for transmitting the HARQ feedback information.

(p) The method of example embodiment (n) or (o), wherein the wireless communication network is an E-UTRAN network and wherein the resource assignment message comprises a Downlink Control Information (DCI) format 0 message or a DCI format 4 message, augmented with one or more fields for carrying the request for HARQ feedback.

(q) The method of example embodiment (m), wherein the request for HARQ feedback is transmitted as part of or in association with a resource assignment message allocating downlink resources to the wireless device.

(r) The method of any of example embodiments (m)-(q), wherein the request for HARQ feedback is transmitted in a resource allocation message that includes a Radio Network Temporary Identifier (RNTI) for the wireless device that indicates that the resource allocation message contains the request for HARQ feedback.

(s) The method of any of example embodiments (m)-(r), wherein the request for HARQ feedback comprises a one-bit field indicating whether or not HARQ feedback for all HARQ processes is requested.

(t) The method of any of example embodiments (m)-(r), wherein the request for HARQ feedback comprises a bit-map, such that each bit in the bitmap corresponds to a particular one of a plurality of HARQ processes and indicates whether feedback is requested for the corresponding HARQ process.

(u) The method of any of example embodiments (m)-(r), wherein the request for HARQ feedback indicates a number of HARQ processes for which the wireless device is to provide feedback.

(v) The method of any of example embodiments (m)-(r), wherein the request for HARQ feedback indicates one or more specific HARQ process numbers.

(w) The method of any of example embodiments (m)-(r), wherein the request for HARQ feedback indicates a specific range of HARQ process numbers.

(x) The method of any of example embodiments (m)-(r), wherein the request for HARQ feedback indicates a range of transmit-time intervals, indicating that the wireless device is to provide HARQ feedback for all HARQ processes active during the indicated range of transmit-time intervals.

(y) A wireless device arranged for operation in a wireless communication network, the wireless device comprising:
  means for receiving from the wireless communication network, in a first transmission-time interval, a request for hybrid automatic repeat-request (HARQ) feedback, the request indicating one or more HARQ processes; and
  means for transmitting to the wireless communication network, in a second transmission-time interval, HARQ feedback information for each of the one or more indicated HARQ processes.

(z) A wireless device adapted to operate in a wireless communication network, the wireless device comprising a radio transceiver configured to communicate with a network node and further comprising a processing circuit adapted to use the radio transceiver to:
  receive from the wireless communication network, in a first transmission-time interval, a request for hybrid automatic repeat-request (HARQ) feedback, the request indicating one or more HARQ processes; and
  transmit to the wireless communication network, in a second transmission-time interval, HARQ feedback information for each of the one or more indicated HARQ processes.

(aa) The wireless device of example embodiment (y) or (z), wherein the wireless device is further adapted to carry out the method of any of example embodiments (b)-(l).

(bb) A network node of a wireless communication system, the network node comprising:
  means for transmitting to a wireless device, in a first transmission-time interval, a request for hybrid automatic repeat-request (HARQ) feedback, the request indicating one or more HARQ processes; and
  means for receiving from the wireless device, in a second transmission-time interval, HARQ feedback information for each of the one or more indicated HARQ processes.

(cc) A network node of a wireless communication system, the network node comprising a radio transceiver configured to communicate with wireless devices and further comprising a processing adapted to use the radio transceiver to:
  transmit to a wireless device, in a first transmission-time interval, a request for hybrid automatic repeat-request (HARQ) feedback, the request indicating one or more HARQ processes; and
  receive from the wireless device, in a second transmission-time interval, HARQ feedback information for each of the one or more indicated HARQ processes.

(dd) The network node of example embodiment (bb) or (cc), wherein the network node is further adapted to carry out the method of any of example embodiments (n)-(x).

What is claimed is:

1. A method, in a wireless device operating in a wireless communication network, the method comprising:
  receiving from the wireless communication network, in a first transmission-time interval, an explicit request for automatic repeat-request (ARQ) feedback, wherein:
    the request indicates at least a particular one of a plurality of active ARQ processes to be included in or excluded from the ARQ feedback;
    the request is received as part of a resource assignment message that includes a Radio Network Temporary Identifier (RNTI) for the wireless device; and
    the RNTI indicates that the resource assignment message includes the request for ARQ feedback; and
  transmitting to the wireless communication network, in a second transmission-time interval, ARQ feedback information for each of the one or more indicated ARQ processes.

2. The method of claim 1, wherein the request for ARQ feedback is received as part of a resource assignment message allocating uplink resources to the wireless device.

3. The method of claim 2, wherein the resource assignment message allocates uplink resources for transmitting the ARQ feedback information.

4. The method of claim 2, wherein the wireless communication network is an E-UTRAN network and wherein the resource assignment message comprises a Downlink Control Information (DCI) format 0 message or a DCI format 4 message, augmented with one or more fields for carrying the request for ARQ feedback.

5. The method of claim 1, wherein the request for ARQ feedback is received as part of a resource assignment message allocating downlink resources to the wireless device.

6. The method of claim 1, wherein the request for ARQ feedback comprises a one-bit field indicating whether or not ARQ feedback for all ARQ processes is requested.

7. The method of claim 1, wherein the request for ARQ feedback comprises a bitmap, such that each bit in the bitmap corresponds to a particular one of the plurality of active ARQ processes and indicates whether feedback is requested for the corresponding ARQ process.

8. The method of claim 1, wherein the request for ARQ feedback indicates a number of ARQ processes for which the wireless device is to provide feedback according to predefined set of rules that specify an order for the plurality of active HARQ processes.

9. The method of claim 1, wherein the request for ARQ feedback indicates one or more specific ARQ process numbers.

10. The method of claim 1, wherein the request for ARQ feedback indicates a specific range of ARQ process numbers.

11. The method of claim 1, wherein the request for ARQ feedback comprises a range of transmit-time intervals, indicating to include feedback for all particular ARQ processes that are active during the range of transmit-time intervals.

12. A method, in a network node of a wireless communication network, the method comprising:
  transmitting to a wireless device, in a first transmission-time interval, an explicit request for automatic repeat-request (ARQ) feedback, wherein:
    the request indicates at least a particular one of a plurality of active ARQ processes to be included in or excluded from the ARQ feedback;
    the request is transmitted as part of a resource assignment message that includes a Radio Network Temporary Identifier (RNTI) for the wireless device; and the RNTI indicates that the resource assignment message includes the request for ARQ feedback; and
receiving from the wireless device, in a second transmission-time interval, ARQ feedback information for each of the one or more indicated ARQ processes.

13. The method of claim 12, wherein the request for ARQ feedback is transmitted as part of a resource assignment message allocating uplink resources to the wireless device.

14. The method of claim 13, wherein the resource assignment message allocates uplink resources for transmitting the ARQ feedback information.

15. The method of claim 13, wherein the wireless communication network is an E-UTRAN network and wherein the resource assignment message comprises a Downlink Control Information (DCI) format 0 message or a DCI format 4 message, augmented with one or more fields for carrying the request for ARQ feedback.

16. The method of claim 12, wherein the request for ARQ feedback is transmitted as part of a resource assignment message allocating downlink resources to the wireless device.

17. The method of claim 12, wherein the request for ARQ feedback comprises a one-bit field indicating whether or not ARQ feedback for all ARQ processes is requested.

18. The method of claim 12, wherein the request for ARQ feedback comprises a bitmap, such that each bit in the bitmap corresponds to a particular one of the plurality of active ARQ processes and indicates whether feedback is requested for the corresponding ARQ process.

19. The method of claim 12, wherein the request for ARQ feedback indicates a number of ARQ processes for which the wireless device is to provide feedback according to predefined set of rules that specify an order for the plurality of active HARQ processes.

20. The method of claim 12, wherein the request for ARQ feedback indicates one or more specific ARQ process numbers.

21. The method of claim 12, wherein the request for ARQ feedback indicates a specific range of ARQ process numbers.

22. The method of claim 12, wherein the request for ARQ feedback comprises a range of transmit-time intervals, indicating to include feedback for all particular ARQ processes that are active during the range of transmit-time intervals.

23. A wireless device configured for operation in a wireless communication network, the wireless device comprising a radio transceiver configured to communicate with a network node and further comprising a processing circuit configured to use the radio transceiver to:
receive from the wireless communication network, in a first transmission-time interval, an explicit request for automatic repeat-request (ARQ) feedback, wherein:
the request indicates at least a particular one of a plurality of active ARQ processes to be included in or excluded from the ARQ feedback;
the request is received as part of a resource assignment message that includes a Radio Network Temporary Identifier (RNTI) for the wireless device; and
the RNTI indicates that the resource assignment message includes the request for ARQ feedback; and
transmit to the wireless communication network, in a second transmission-time interval, ARQ feedback information for each of the one or more indicated ARQ processes.

24. The wireless device of claim 23, wherein the wireless device is configured to receive the request for ARQ feedback as part of a resource assignment message allocating uplink resources to the wireless device.

25. The wireless device of claim 24, wherein the resource assignment message allocates uplink resources for transmitting the ARQ feedback information.

26. The wireless device of claim 24, wherein the wireless communication network is an E-UTRAN network and wherein the resource assignment message comprises a Downlink Control Information (DCI) format 0 message or a DCI format 4 message, augmented with one or more fields for carrying the request for ARQ feedback.

27. The wireless device of claim 23, wherein the wireless device is configured to receive the request for ARQ feedback as part of a resource assignment message allocating downlink resources to the wireless device.

28. The wireless device of claim 23, wherein the request for ARQ feedback comprises a one-bit field indicating whether or not ARQ feedback for all ARQ processes is requested.

29. The wireless device of claim 23, wherein the request for ARQ feedback comprises a bitmap, such that each bit in the bitmap corresponds to a particular one of the plurality of active ARQ processes and indicates whether feedback is requested for the corresponding ARQ process.

30. The wireless device of claim 23, wherein the request for ARQ feedback indicates a number of ARQ processes for which the wireless device is to provide feedback according to predefined set of rules that specify an order for the plurality of active HARQ processes.

31. The wireless device of claim 23, wherein the request for ARQ feedback indicates one or more specific ARQ process numbers.

32. The wireless device of claim 23, wherein the request for ARQ feedback indicates a specific range of ARQ process numbers.

33. The wireless device of claim 23, wherein the request for ARQ feedback comprises a range of transmit-time intervals, indicating to include feedback for all particular ARQ processes that are active during the range of transmit-time intervals.

34. A network node of a wireless communication system, the network node comprising a radio transceiver configured to communicate with wireless devices and further comprising a processing circuit configured to use the radio transceiver to:
transmit to a wireless device, in a first transmission-time interval, an explicit request for automatic repeat-request (ARQ) feedback, wherein:
the request indicates at least a particular one of a plurality of active ARQ processes to be included in or excluded from the ARQ feedback;
the request is transmitted as part of a resource assignment message that includes a Radio Network Temporary Identifier (RNTI) for the wireless device; and
the RNTI indicates that the resource assignment message includes the request for ARQ feedback; and
receive from the wireless device, in a second transmission-time interval, ARQ feedback information for each of the one or more indicated ARQ processes.

35. The network node of claim 34, wherein the network node is configured to transmit the request for ARQ feedback as part of a resource assignment message allocating uplink resources to the wireless device.

36. The network node of claim 35, wherein the resource assignment message allocates uplink resources for transmitting the ARQ feedback information.

37. The network node of claim 35, wherein the wireless communication network is an E-UTRAN network and wherein the resource assignment message comprises a Downlink Control Information (DCI) format 0 message or a DCI format 4 message, augmented with one or more fields for carrying the request for ARQ feedback.

38. The network node of claim 34, wherein the network node is configured to transmit the request for ARQ feedback as part of a resource assignment message allocating downlink resources to the wireless device.

39. The network node of claim 34, wherein the request for ARQ feedback comprises a one-bit field indicating whether or not ARQ feedback for all ARQ processes is requested.

40. The network node of claim 34, wherein the request for ARQ feedback comprises a bitmap, such that each bit in the bitmap corresponds to a particular one of the plurality of active ARQ processes and indicates whether feedback is requested for the corresponding ARQ process.

41. The network node of claim 34, wherein the request for ARQ feedback indicates a number of ARQ processes for which the wireless device is to provide feedback according to predefined set of rules that specify an order for the plurality of active HARQ processes.

42. The network node of claim 34, wherein the request for ARQ feedback indicates one or more specific ARQ process numbers.

43. The network node of claim 34, wherein the request for ARQ feedback indicates a specific range of ARQ process numbers.

44. The network node of claim 34, wherein the request for ARQ feedback comprises a range of transmit-time intervals, indicating to include feedback for all particular ARQ processes that are active during the range of transmit-time intervals.

45. A non-transitory computer-readable medium comprising, stored thereupon, program instructions that, when executed by a processing circuit in a wireless device operating in a wireless communication network, cause the wireless device to:
receive from the wireless communication network, in a first transmission-time interval, an explicit request for automatic repeat-request (ARQ) feedback, wherein:
the request indicates at least a particular one of a plurality of active ARQ processes to be included in or excluded from the ARQ feedback;
the request is received as part of a resource assignment message that includes a Radio Network Temporary Identifier (RNTI) for the wireless device; and
the RNTI indicates that the resource assignment message includes the request for ARQ feedback; and
transmit to the wireless communication network, in a second transmission-time interval, ARQ feedback information for each of the one or more indicated ARQ processes.

46. A non-transitory computer-readable medium comprising, stored thereupon, program instructions that, when executed by a processing circuit in a network node of a wireless communication network, cause the network node to:
transmit to a wireless device, in a first transmission-time interval, an explicit request for automatic repeat-request (ARQ) feedback, wherein:
the request indicates at least a particular one of a plurality of active ARQ processes to be included in or excluded from the ARQ feedback;
the request is transmitted as part of a resource assignment message that includes a Radio Network Temporary Identifier (RNTI) for the wireless device; and
the RNTI indicates that the resource assignment message includes the request for ARQ feedback; and
receive from the wireless device, in a second transmission-time interval, ARQ feedback information for each of the one or more indicated ARQ processes.

* * * * *